US012421024B2

(12) United States Patent
Costa Marques et al.

(10) Patent No.: US 12,421,024 B2
(45) Date of Patent: Sep. 23, 2025

(54) EXTENSION DEVICE FOR REFUSE CONTAINERS

(71) Applicants: Estevam Luiz Del Nero Costa Marques, Orlando, FL (US); Daniel Estevam Galdino Costa Marques, Orlando, FL (US)

(72) Inventors: Estevam Luiz Del Nero Costa Marques, Orlando, FL (US); Daniel Estevam Galdino Costa Marques, Orlando, FL (US)

( * ) Notice: Subject to any disclaimer, the term of this patent is extended or adjusted under 35 U.S.C. 154(b) by 43 days.

(21) Appl. No.: 18/216,407

(22) Filed: Jun. 29, 2023

(65) Prior Publication Data

US 2023/0348182 A1 Nov. 2, 2023

Related U.S. Application Data

(63) Continuation-in-part of application No. 17/876,236, filed on Jul. 28, 2022.

(60) Provisional application No. 63/358,458, filed on Jul. 5, 2022, provisional application No. 63/255,589, filed on Oct. 14, 2021.

(51) Int. Cl.
*B65F 1/14* (2006.01)

(52) U.S. Cl.
CPC .......... *B65F 1/1452* (2013.01); *B65F 1/1473* (2013.01); *B65F 2210/148* (2013.01)

(58) Field of Classification Search
CPC .......... A47J 45/06; A47J 45/061; A47J 45/07; A47J 45/10; B65F 1/1452; B65F 1/1457; B65F 25/28
See application file for complete search history.

(56) References Cited

U.S. PATENT DOCUMENTS 3,380,752 A 4/1968 Goettl et al.
3,585,781 A 6/1971 Blee
4,609,200 A 9/1986 Winter
4,807,916 A * 2/1989 Erickson .................. B62B 5/06 294/27.1
6,309,167 B1 10/2001 Pherrin
8,251,248 B1 8/2012 Holmes
(Continued)

FOREIGN PATENT DOCUMENTS

DE 202007016928 3/2008
EP 1183196 B1 11/2002
WO 2008083425 A1 7/2008

*Primary Examiner* — Andrew T Kirsch
(74) *Attorney, Agent, or Firm* — Jason T. Daniel, Esq.; Daniel Law Offices, P.A.

(57) ABSTRACT

An extension device for a refuse container includes a pair of Y-shaped sides, each having a top end and a pair of spaced apart bottom ends. Two bumpers are positioned between the spaced apart bottom ends, and a device handle is positioned between the top ends of each side. A refuse handle capture assembly is positioned between the sides of the device and includes a pair of circular arms that are rotated by a central rod to transition between a locked and an unlocked position. Each of the arms include an opening for receiving and engaging the handle of a refuse container. When secured onto a refuse container, the bumpers engage the lid and back wall of the container and the device handle is positioned diagonally outward from the container to provide an adjustable mechanical advantage for allowing a user to tilt and move the refuse container.

19 Claims, 7 Drawing Sheets

(56) References Cited

U.S. PATENT DOCUMENTS

| | | | | |
|---|---|---|---|---|
| 8,453,872 | B1 | 6/2013 | Holmes | |
| 9,150,066 | B1 | 10/2015 | Cooper | |
| 2005/0145637 | A1 * | 7/2005 | Lin | A47J 45/071 220/759 |
| 2010/0078233 | A1 | 4/2010 | Fletcher et al. | |
| 2014/0246439 | A1 | 9/2014 | Friedman | |
| 2021/0015245 | A1 * | 1/2021 | Ivanenko | A45F 5/102 |

* cited by examiner

EXTENSION DEVICE FOR REFUSE CONTAINERS

CROSS-REFERENCE TO RELATED APPLICATIONS

This application claims the benefit of U.S. Application Ser. No. 63/358,458 filed on Jul. 5, 2022, and is a continuation-in part of and claims the benefit of U.S. application Ser. No. 17/876,236 filed on Jul. 28, 2022, the contents of each of which are incorporated herein by reference.

TECHNICAL FIELD

The present invention relates generally to waste management products, and more particularly to an extension device for refuse containers.

BACKGROUND

The statements in this section merely provide background information related to the present disclosure and may not constitute prior art.

In recent years, many municipalities have begun mandating the use of specific refuse containers for residential and commercial waste. In many instances, the containers are provided by the local agency responsible for garbage collection and are specifically chosen to be suitable for use with automated rear or side-loading arms that are secured onto modern waste collection vehicles.

In order to reduce the number of visits and the costs involved in waste collection efforts, these refuse containers are typically large, wheeled bins having a hinged lid and a capacity of between 60 and 96 gallons. Although useful for receiving and storing large amounts of waste, these containers suffer from many practical drawbacks for residents who must use them every day.

For example, due to the large size and weight of the containers, many users have a difficult time transitioning the container onto its wheels and then physically pushing or pulling the container to the curb. This is particularly difficult due to the close proximity of the handle to the side of the container, as the handle also functions as the support for the hinged lid mechanism. Additionally, it is not uncommon for water, dirt, and other grime to accumulate along the top surface of the lid between uses. In many instances, a user does not notice these materials until they use the handle to tilt the container toward them, at which time the water and other grime are unceremoniously splashed onto the user's legs or clothing.

Accordingly, it would be beneficial to provide an extension device for refuse containers that can be quickly and easily secured onto a container in order to overcome each of the drawbacks noted above.

SUMMARY OF THE INVENTION

The present invention is directed to an extension device for a refuse container. One embodiment of the present invention can include a pair of generally Y-shaped sides, each having a top end and a pair of spaced apart bottom ends. The sides can be positioned parallel to each other via two bumpers that are positioned between the pair of spaced apart bottom ends, and a device handle that is positioned between the top ends of each side.

In one embodiment, a refuse handle capture assembly can be positioned between the sides of the device preferably at a location that is equidistant to the two bumpers. The assembly can include a pair of circular arms that are rotated by a central rod to transition between a locked and an unlocked position. Each of the arms can include openings for receiving and engaging the handle of a refuse container. Of course, other embodiments are contemplated wherein the bumpers are not equidistant to the handle capture assembly.

The assembly can be positioned at different locations along the length of the Y-shaped side members in order to engage refuse containers having different shapes and sizes. When secured onto a refuse container, the bumpers can engage the lid and back wall of the container and the device handle can be positioned diagonally outward from the container to provide an adjustable mechanical advantage for allowing a user to tilt and move the refuse container.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
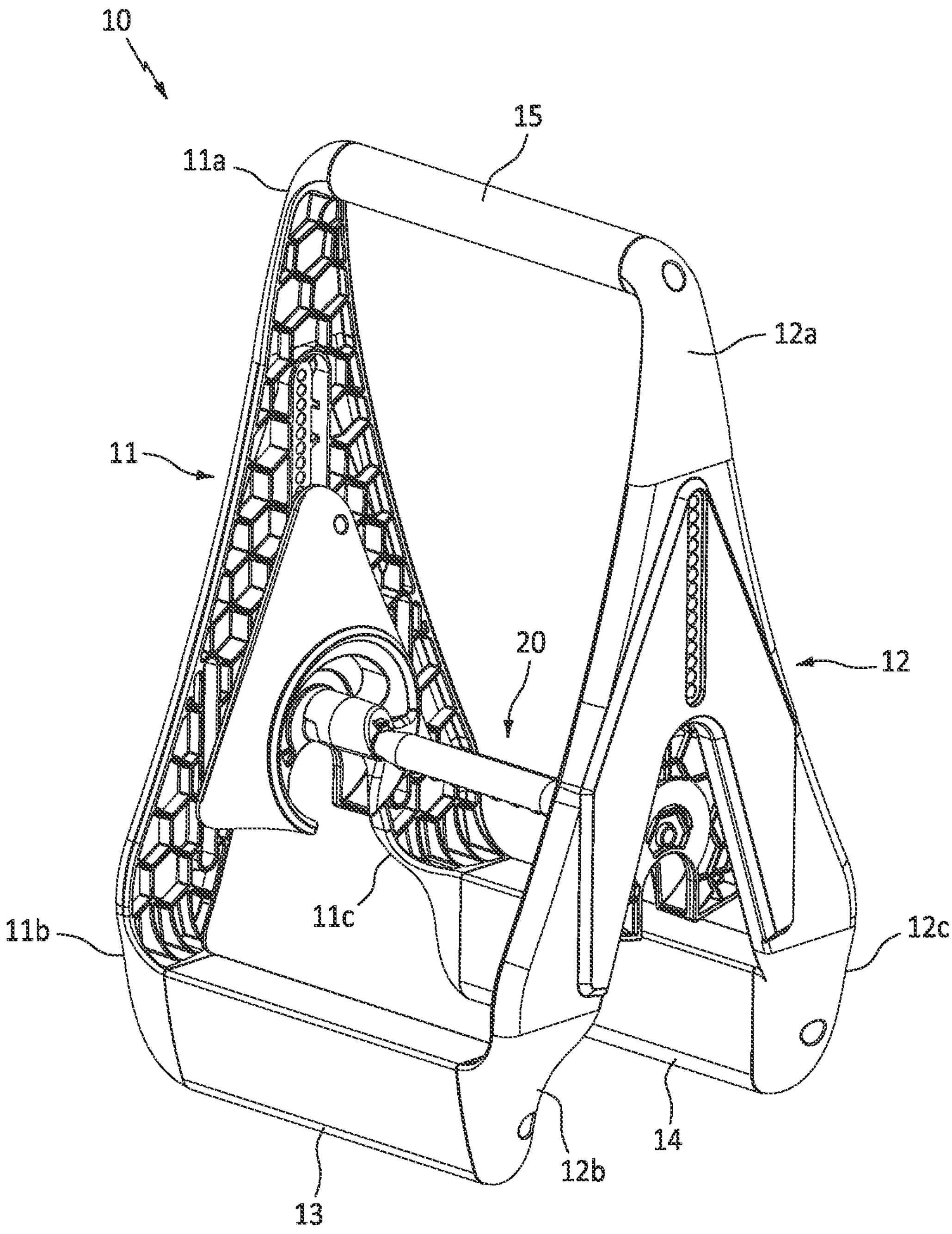
FIG. 1 is a perspective view of an extension device for refuse containers that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "slidingly engage", "telescopically connected" and derivatives thereof shall be used interchangeably to describe a situation wherein two identified objects are connected such that one identified part moves relative to the other.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles, clamps, sockets, clips, and compression fittings for example. Each illustrated connector and/or complementary connector can be permanently secured to the illustrated portion of the device via a permanent sealer such as glue, adhesive tape, or stitching, for example.

FIGS. 1-7 illustrate one embodiment of an extension device for refuse containers 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Although illustrated below for use with a wheeled refuse container the inventive concepts are not to be construed as limiting to any such use. To this end, the device 10 can be used with any type of bin or container wherein it is beneficial to have an increased ability to grasp and maneuver the same.

As shown at FIG. 1, the device 10 can include a first generally Y-shaped side member 11 having a top end 11*a*, and a pair of spaced apart bottom ends 11*b* and 11*c*, and a second generally Y-shaped side member 12 also having a top end 12*a*, and a pair of spaced apart bottom ends 12*b* and 12*c*. The side members can be positioned parallel to each other, and a pair of bumpers 13 and 14 can be positioned between the bottom ends 11*b*-12*b* and 11*c*-12*c*, and a handle 15 can be positioned between each of the top ends 11*a* and 12*a*, respectively.

In the preferred embodiment, the device components may be formed from materials that are, for example, relatively strong and stiff, while remaining lightweight such that the overall weight of the device does not exceed 10 pounds, for example. Several nonlimiting examples include but are not limited to various metals or metal alloys, plastics/polymers, and/or various composite materials (e.g., carbon fibers in a polymer matrix, fiberglass, etc.).

Although not illustrated, other embodiments of the device 10 are contemplated wherein the spaced apart bottom ends of the side members are hingedly attached to the upper portions so as to allow the device to be stored in a flat orientation. Likewise, the length of the side members may include telescoping sections so as to increase or decrease the overall length (e.g., distance between bumpers and handle) of the device. Such a feature provides a user-adjustable mechanical advantage when maneuvering refuse containers or other such bins.

In either instance, one embodiment of a refuse handle capture assembly 20 can be positioned between the side members 11 and 12 at a location that is equidistant from the bumpers 13 and 14, and diagonally toward the handle 15. As will be described below, the position of the assembly can be adjusted by a user to suit the particular dimensions of a refuse container for which the device will be used.

Figure 2A:
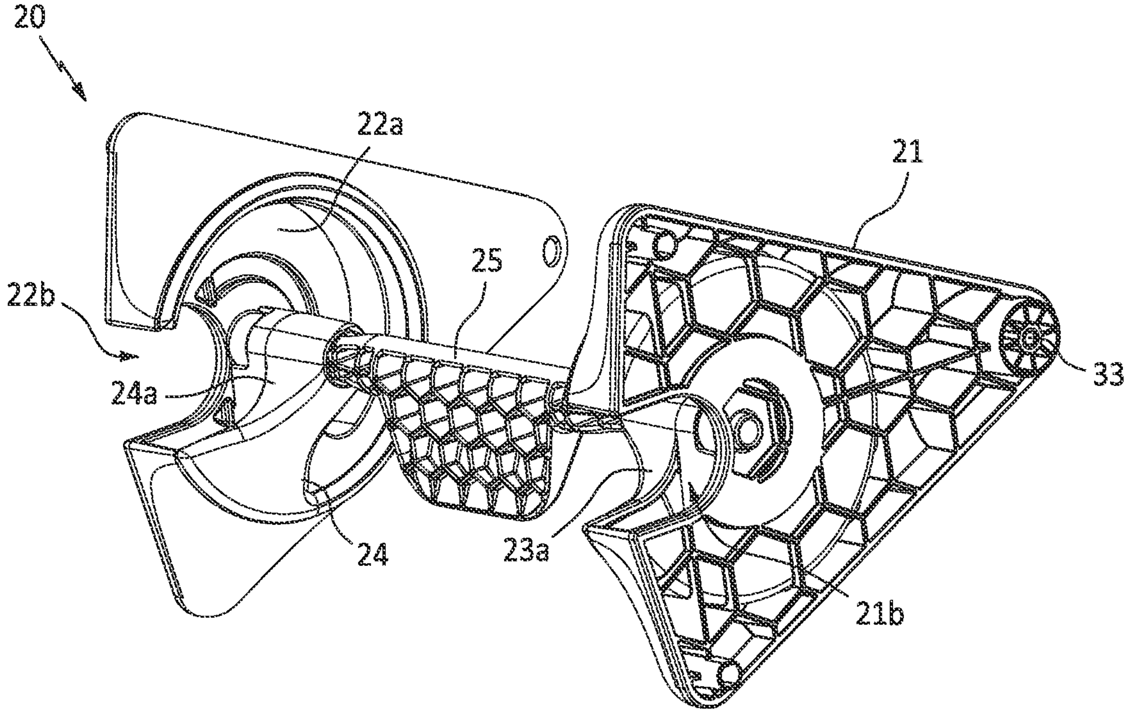
FIG. 2A is a cutout view of the refuse handle capture assembly of the extension device for refuse containers in the unlocked position, in accordance with one embodiment of the invention.
Figure 2B:
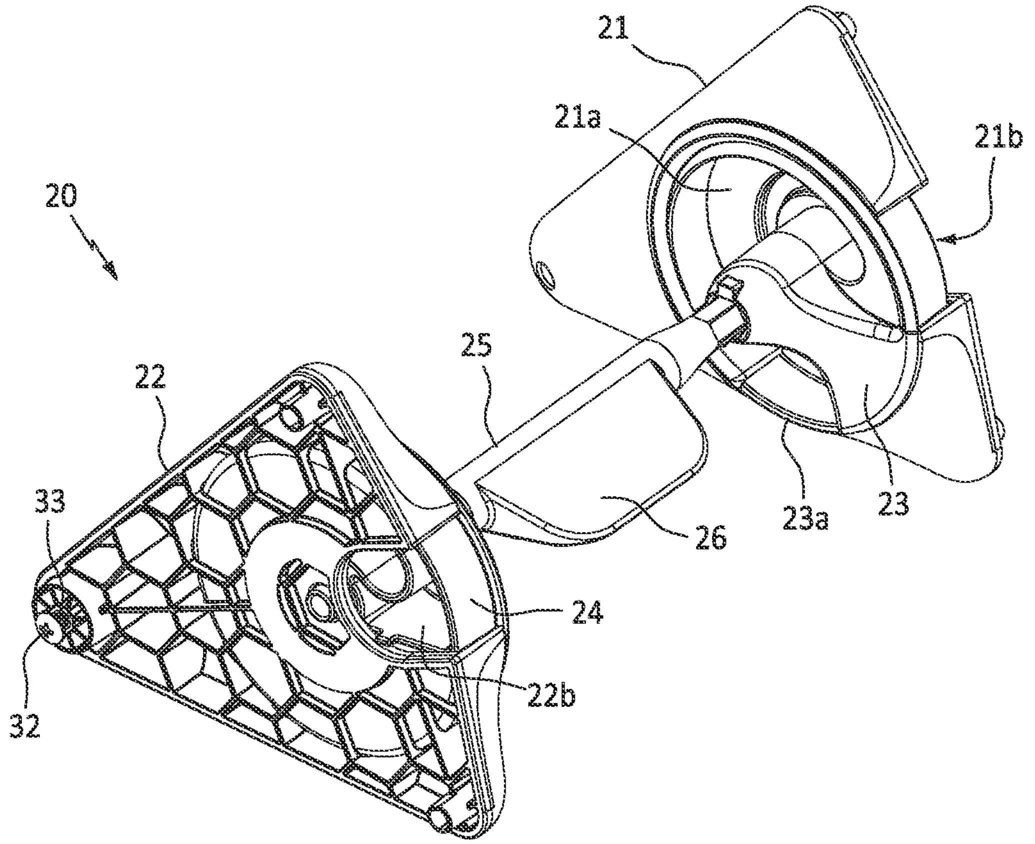
FIG. 2B is a cutout view of the refuse handle capture assembly of the extension device for refuse containers in the locked position, in accordance with one embodiment of the invention.

As shown best at the cutout FIGS. 2A and 2B, the handle capture assembly 20 can include a first generally triangular-shaped securement wall 21 having a first circular recessed area 21*a* and a first opening 21*b* that is formed along the front end of the first wall and that extends into the first opening. The capture assembly can also include a second generally triangular-shaped securement wall 22 having a second circular recessed area 22*a* and a second opening 22*b* that is formed along the front end of the second wall and that extends into the second opening.

In one embodiment, a pair of circular arms 23 and 24 are provided within the recessed areas 21*a* and 22*a*, of the first and second walls 21 and 22, respectively. Each of the circular arms having openings 23*a* and 24*a* that are complementary in shape and size to openings 21*b* and 22*b*, respectively.

In one embodiment, a central rod 25 having a rod lever 26 is connected to the center of each of the circular arms 23 and 24. The rod can function to rotate the arms within the circular recessed areas of the first and second walls so as to transition the assembly between an unlocked position (FIG. 2A) wherein openings 21*b*/23*a* and 22*b*/24*a* are aligned, and a locked position (FIG. 2B) wherein openings 21*b*/23*a* and 22*b*/24*a* are not aligned.

Figure 3:
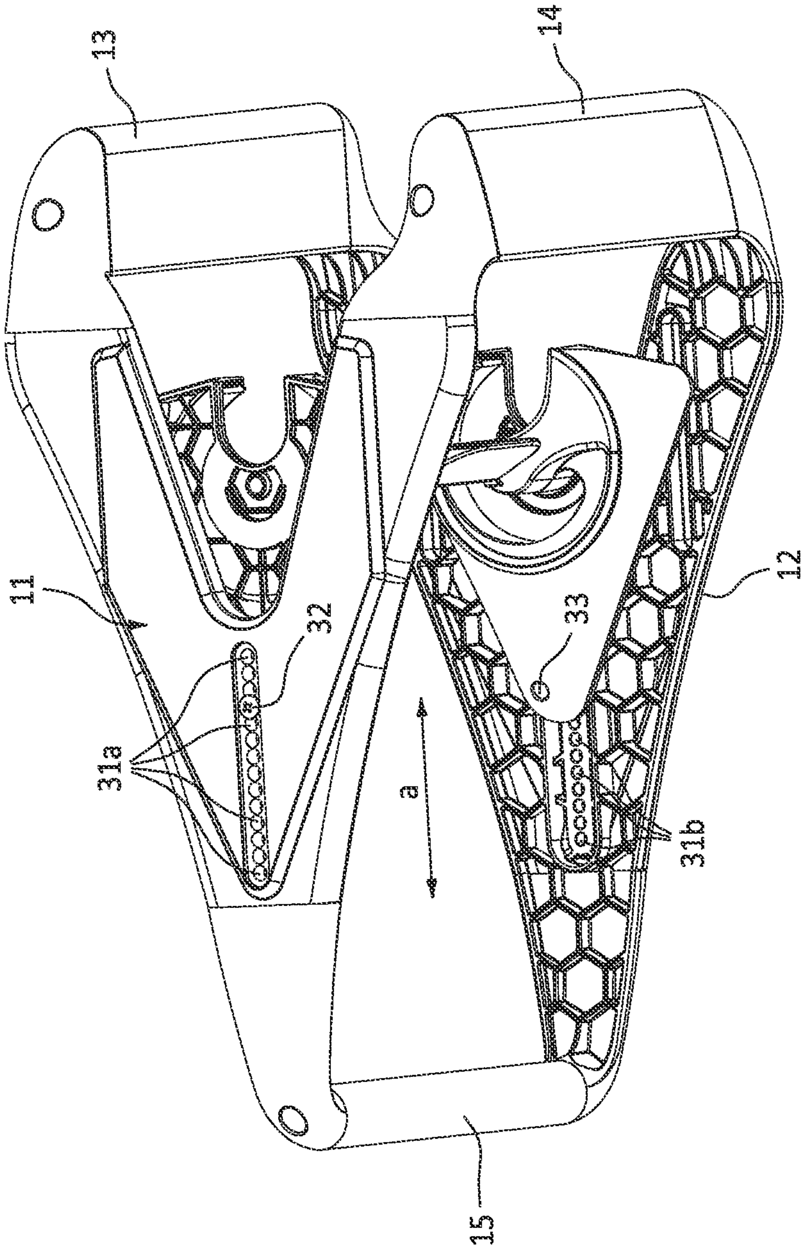
FIG. 3 is a side view of the extension device for refuse container, in accordance with one embodiment of the invention.
Figure 4:
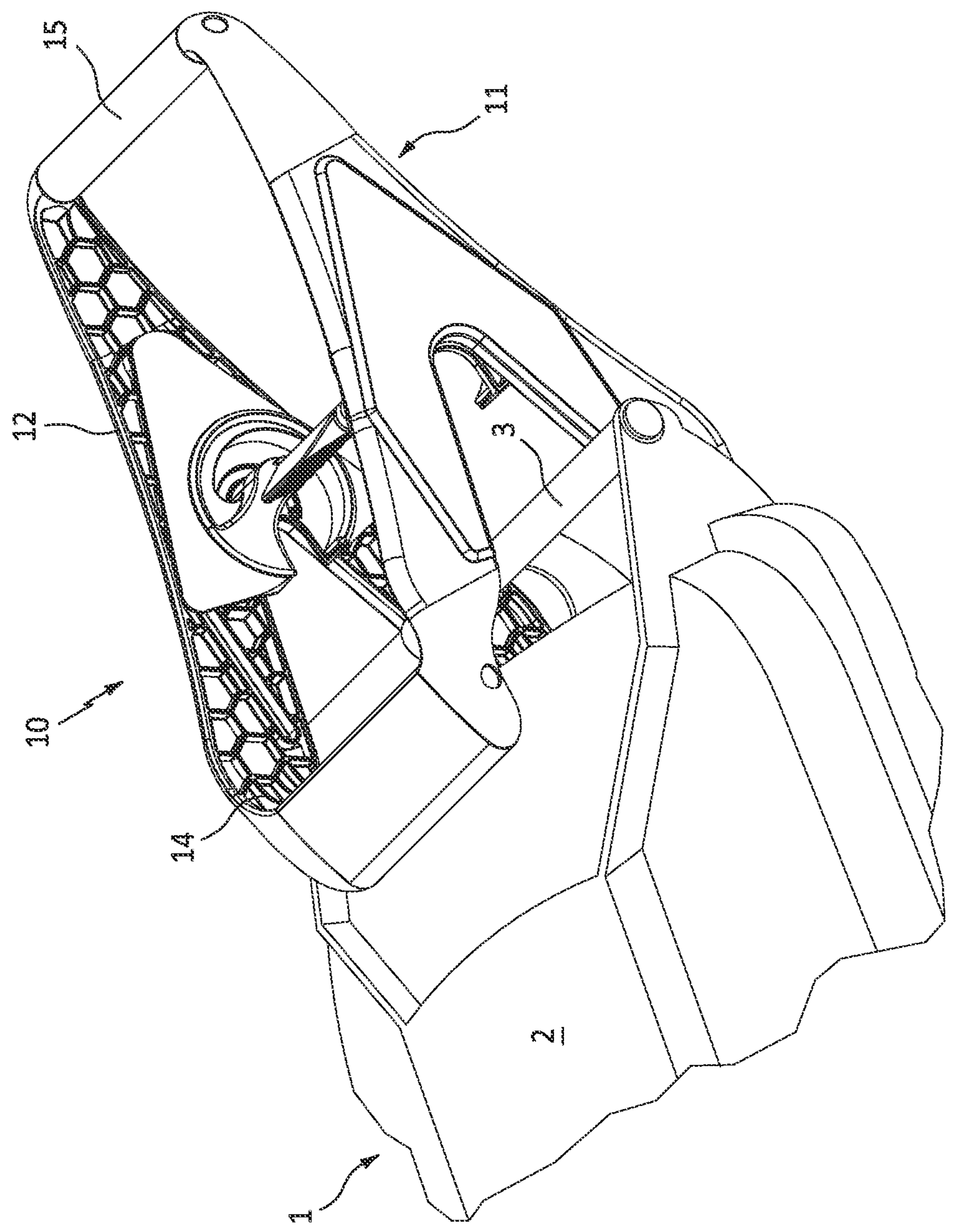
FIG. 4 is a perspective view of the extension device for refuse container in operation, in accordance with one embodiment of the invention.
Figure 5:
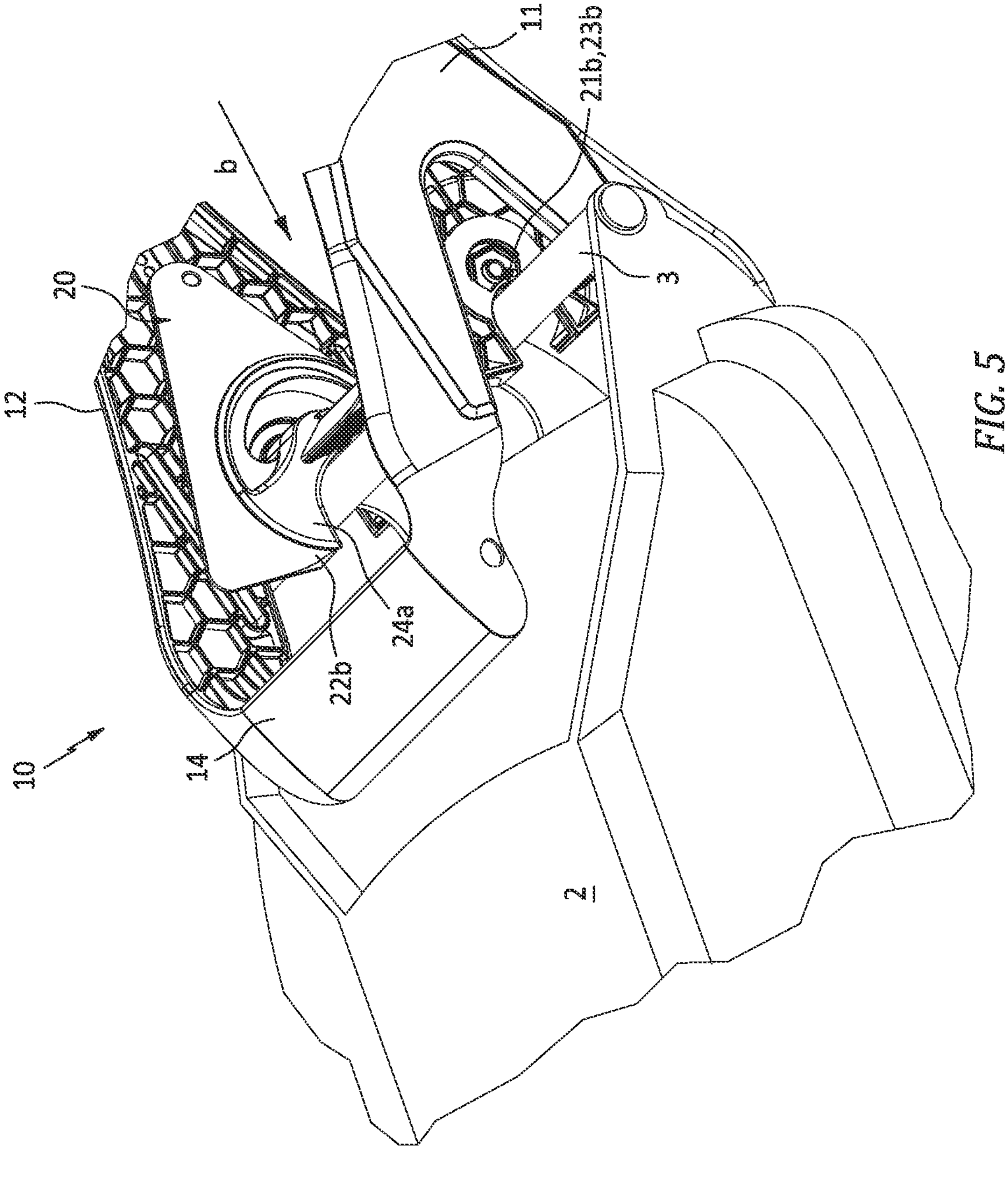
FIG. 5 is another perspective view of the extension device for refuse container in operation, in accordance with one embodiment of the invention.
Figure 6:
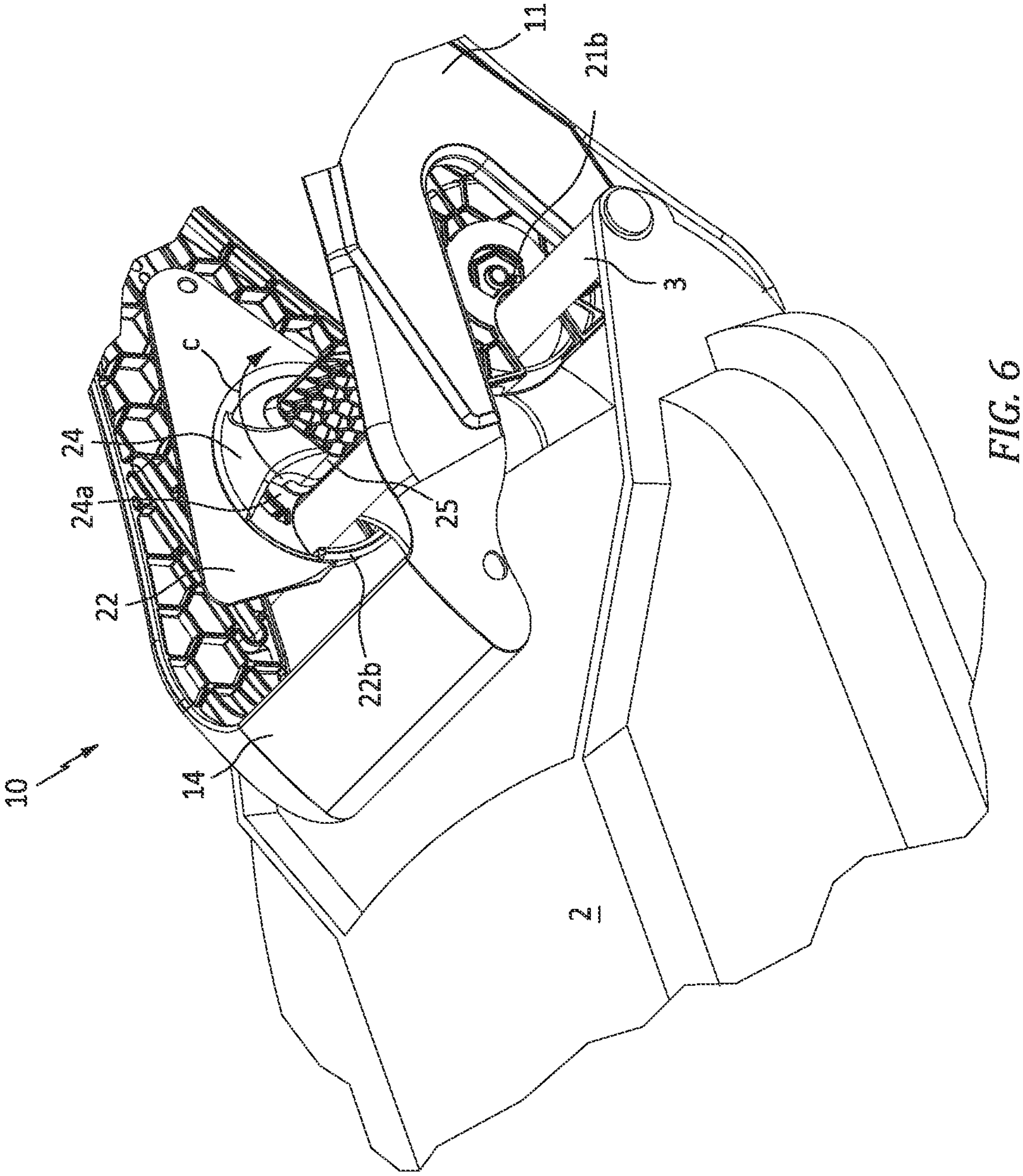
FIG. 6 is another perspective view of the extension device for refuse container in operation, in accordance with one embodiment of the invention.
Figure 7:
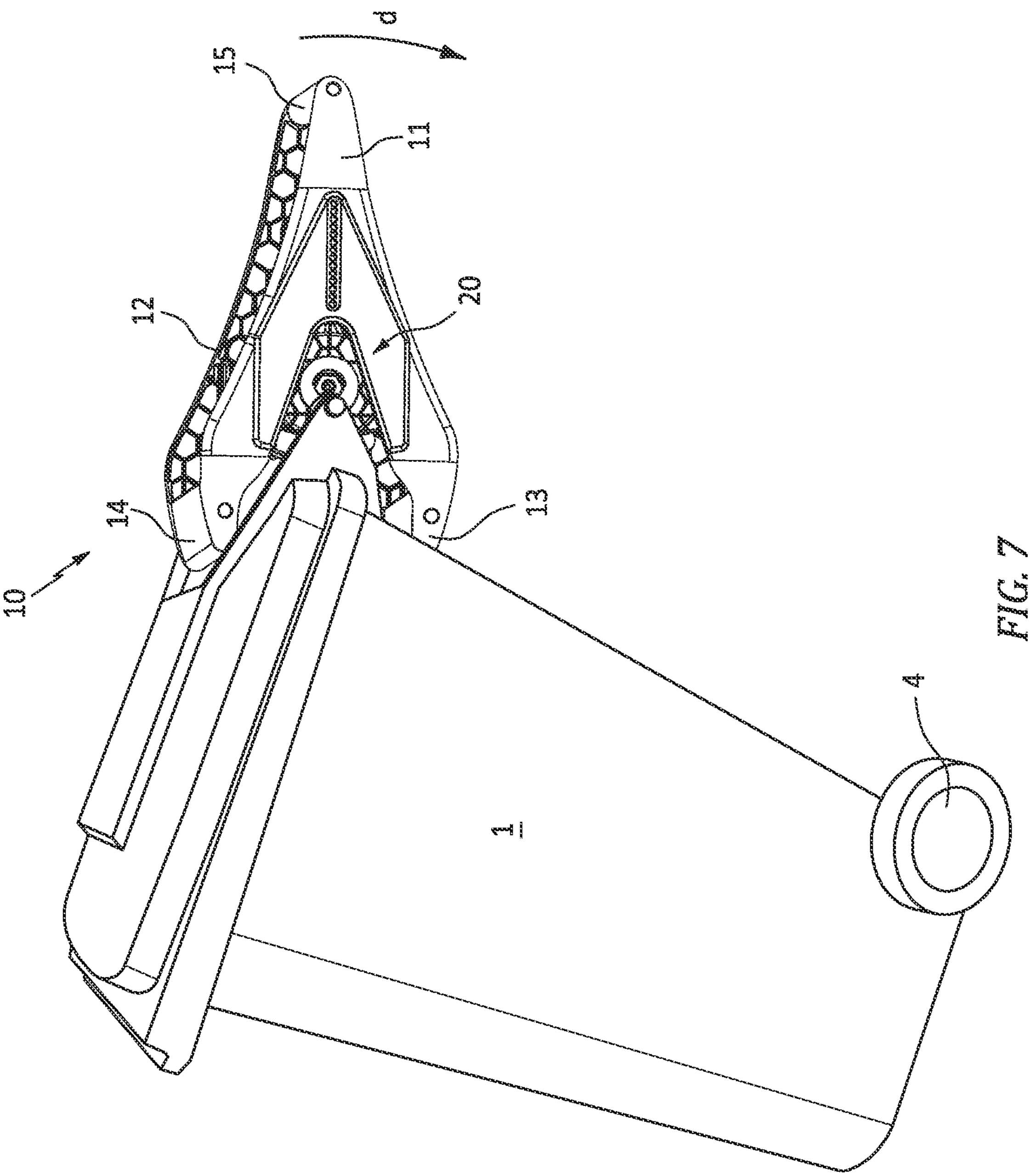
FIG. 7 is another perspective view of the extension device for refuse container in operation, in accordance with one embodiment of the invention.

As shown best at FIG. 3, the refuse handle capture assembly 20 can be slidingly positioned (arrow a) along the length of the side members 11 and 12 so as to be able to engage a wide variety of refuse containers whose handles extend at different amounts from the container bodies. To this end, one embodiment of the device can include a plurality of apertures 31*a* positioned along wall 11, and a plurality of complementary apertures 31*b* that are positioned alongside wall 12. Each of the apertures can function to receive mounting hardware such as the illustrated bolts 32, for example, that can pass therethrough to be secured within openings 33 in the securement walls 21 and 22 (See FIGS. 2A and 2B). Such a feature functions to allow the capture assembly to be positioned at any number of different positions along the length of the device.

Of course, the device is not limited to the use of the openings and bolts, as any number of other connectors may be provided for adjusting and securing the handle capture assembly 20 along the length of the device.

FIGS. 4-7 illustrate one embodiment of the device 10 in operation with a refuse container 1. As shown, the device can be positioned against the container such that one of the bumpers e.g., 13 is resting against the back wall of the container, the other bumper e.g., 14 is positioned against the lid 2 of the container, and the handle 3 of the container is positioned between the bumpers.

Next, the refuse handle capture assembly 20 can be slid (see arrow b) toward the container until the horizontal portion of the container handle 3 is located within the aligned openings 21*b*/23*a* and 22*b*/24*a* of the assembly in the unlocked position.

When so positioned, the rod 25 can be rotated (see arrow c) to transition the handle capture assembly into the locked position wherein the handle 3 is secured within the openings 21*b* and 22*b* of the securement walls by the circular arms 23 and 24, respectively.

Finally, when the device is secured onto the container 1, a user can grasp and pull the handle 15 downward to rotate (see arrow d) the container 1 onto its wheels 4 and can then push or pull the container in any desired direction.

As would be apparent to those of skill in the art, the use of an elongated handle extending away from the handle of the container provides the user with physical leverage and mechanical advantage that allows the user to tilt and move the container with significantly reduced effort—about 50%, even when the container is filled to the maximum capacity. Moreover, because the handle 15 of the device 10 is positioned away from the lid 2 of the container, any liquids or other such debris that has accumulate along the lid will not make contact with the user during the tilting of moving of the container. Furthermore, when the device is positioned onto the lid of the container, the device will secure the lid in the closed position, thus preventing items from escaping if the container is tipped over and/or preventing access by animals such as racoons, rodents, cats, dogs, skunks, for example.

As described herein, one or more elements of the extension device for refuse containers 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An extension device for a refuse container, said device comprising:

a first side member having a top end, a first bottom end, and a second bottom end;

a second side member that is positioned parallel to the first side member, said second side member having a top end, a first bottom end, and a second bottom end;

a first bumper that is positioned between the first bottom end of the first side member and the first bottom end of the second side member;

a second bumper that is positioned between the second bottom end of the first side member and the second bottom end of the second side member; and a refuse handle capture assembly that includes a first circular arm that is rotatably positioned along the first side member, a second circular arm that is rotatably positioned along the second side member, and a central rod that extends between the first circular arm and the second circular arm, wherein each of the first circular arm and the second circular arm functions to removably engage a handle of a refuse container.

2. The device of claim 1, wherein the circular arms of the refuse handle capture assembly are each configured to transition between a locked position and an unlocked position.

3. The device of claim 2, wherein in the locked position, a portion of the handle of the refuse container is secured by the circular arms of the refuse handle capture assembly.

4. The device of claim 3, further comprising:

a device handle that is positioned between the top end of the first side member and the top end of the second side member.

5. The device of claim 4, wherein in the locked position, the device handle is positioned away from the handle of the refuse container.

6. The device of claim 1, wherein the refuse handle capture assembly is positioned equidistantly between the first bumper and the second bumper.

7. The device of claim 6, wherein at least one of the first bumper or the second bumper is secured against a lid of the refuse container when the refuse handle capture assembly is engaged with the handle of the refuse container.

8. The device of claim 6, wherein at least one of the first bumper or the second bumper is secured against a back wall of the refuse container when the refuse handle capture assembly is engaged with the handle of the refuse container.

9. The device of claim 8, further comprising:

a device handle that is positioned between the top end of the first side member and the top end of the second side member.

10. The device of claim 9, wherein the device handle is positioned away from the handle of the refuse container when the refuse handle capture assembly is engaged with the handle of the refuse container.

11. The device of claim 1, further comprising:

a first securement wall that is positioned along the first side member; and a second securement wall that is positioned along the second side member.

12. The device of claim 11, further comprising:

a first circular recessed area that is positioned along the first securement wall;

a first opening that is positioned along the first circular recessed area;

a second circular recessed area that is positioned along the second securement wall; and a second opening that is positioned along the second circular recessed area.

13. The device of claim 12, wherein the first circular arm is positioned within the first recessed area, and the second circular arm is positioned within the second recessed area.

14. The device of claim 13, further comprising:

a first arm opening that is positioned along the first circular arm; and a second arm opening that is positioned along the second circular arm.

15. The device of claim 14, wherein the circular arms of the refuse handle capture assembly are each configured to transition between a locked position and an unlocked position.

16. The device of claim 15, wherein in the unlocked position, the first arm opening is serially aligned with the first opening, and the second arm opening is serially aligned with the second opening.

17. The device of claim 15, wherein in the locked position, the first arm opening is not serially aligned with the first opening, and the second arm opening is not serially aligned with the second opening.

18. The device of claim 1, wherein a movement of the central rod rotates each of the first circular arm and the second circular arm between a locked position and an unlocked position.

19. The device of claim 18, further comprising:

a rod lever that is positioned along the central rod.

* * * * *